UNITED STATES PATENT OFFICE.

FREDERICK WHITFIELD GEE, OF HARROW, ENGLAND.

ANIMAL FOODSTUFF.

1,365,393.     Specification of Letters Patent.     Patented Jan. 11, 1921.

No Drawing.     Application filed November 13, 1919. Serial No. 337,702.

*To all whom it may concern:*

Be it known that I, FREDERICK WHITFIELD GEE, a subject of the King of England, residing at Harrow, Middlesex, England, have invented certain new and useful Improvements in Animal Foodstuffs, of which the following is a specification.

This invention is for improvements in or relating to animal food-stuffs, and has for its object to provide a food-stuff made from garbage, of the kind described hereinafter, which shall have a high nutritive value and yet keep almost indefinitely. The kind of garbage to which this invention relates consists of any matter such as is generally obtained from hotels, canteens and the like, and is sold as swill or hog-wash for feeding direct to live-stock, but instead of feeding it direct it is treated as described below. In addition to such waste material, animal material in the form of meat meal, slaughter-house offal or fish meal can be used; obviously various sources will suggest themselves whence both vegetable and animal material can be obtained. The invention does not relate to the treatment of distillery slop which is a residuum of a distillation process and is not included in the term "garbage" as herein employed. The difficulty found with garbage is that although it contains a large amount of nutritive substance, it is of such a character that it cannot be easily preserved, and thus it is impossible to distribute it from the centers where it is obtained to the outlying districts where it would be of use as an animal food. If the garbage is dried, it not only becomes expensive to dry it sufficiently to insure that it shall not immediately ferment, but it easily re-absorbs moisture and commences to decompose.

According to this invention, the process of obtaining a food substance from garbage, preferably a mixture of vegetable animal or fish-offal and waste, consists in cooking the garbage in a steam-jacketed or other machine at a temperature above boiling-point, for example approximately 250°–260° F., until any moisture in excess of, say, 30% by weight of the solid matter, has been driven off, mixing with the cooked garbage pulverized farinaceous material, such as bakers' sweepings in the proportion of about 20%–25% by weight, relatively to the weight of the garbage (with the moisture then contained therein), and baking the doughy mass thus obtained. The vegetable material may consist of cabbage-leaves, potato-, carrot-, or turnip-parings, and other such waste, and the cooking apparatus is conveniently provided with stirring means.

It is found that garbage treated in this manner is sterilized by the cooking process and becomes dry in the baking process so that provided it is kept in a dry place, it does not decompose.

The baking is carried on at a temperature such as is employed for baking bread and is continued until the material resembles what is commonly known as a baked product in dough or similar materials and the completed food substance produced by the process described above has the appearance of a dog-biscuit or a similar baked product.

The food values may, of course, be varied according to what the food substance is required for, for instance, for feeding pigs good results are obtained by employing 50% of vegetable material and 50% of animal material.

The cakes if only slightly baked can be scalded and fed to pigs in the same manner as swill, or if they are more thoroughly baked, they may be ground and fed to poultry; other uses will suggest themselves.

What I claim as my invention and desire to secure by Letters Patent is:—

1. The process of obtaining a food substance from garbage of the kind described, consisting in cooking the garbage at a temperature above boiling-point until any moisture in excess of about 30% by weight of the solid matter has been driven off, mixing with the cooked garbage pulverized farinaceous material such as bakers' sweepings in the proportion of about 20% to 25% by weight relatively to the weight of the garbage (with the moisture then contained therein) and baking the doughy mass thus obtained.

2. A baked food-substance comprising garbage from which any moisture in excess of about 30% by weight of the solid matter has been driven off, and pulverized farinaceous material such as bakers' sweepings in the proportion of about 20% to 25% by weight relatively to the weight of the garbage with the remaining moisture.

In testimony whereof I affix my signature.

FREDERICK WHITFIELD GEE.